US010433296B2

(12) United States Patent
Takeda et al.

(10) Patent No.: US 10,433,296 B2
(45) Date of Patent: Oct. 1, 2019

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Kazuaki Takeda, Tokyo (JP); Hideaki Takahashi, Tokyo (JP); Hiromasa Umeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/044,776

(22) Filed: Jul. 25, 2018

(65) Prior Publication Data

US 2018/0359734 A1 Dec. 13, 2018

Related U.S. Application Data

(63) Continuation of application No. 15/039,235, filed as application No. PCT/JP2014/080071 on Nov. 13, 2014, now abandoned.

(30) Foreign Application Priority Data

Nov. 26, 2013 (JP) ................. 2013-244047
Feb. 6, 2014 (JP) ................. 2014-021429
Feb. 25, 2014 (JP) ................. 2014-033562

(51) Int. Cl.
*H04W 72/04* (2009.01)
*H04L 5/14* (2006.01)
*H04W 72/12* (2009.01)

(52) U.S. Cl.
CPC ......... *H04W 72/042* (2013.01); *H04L 5/1415* (2013.01); *H04W 72/0413* (2013.01); *H04W 72/1252* (2013.01)

(58) Field of Classification Search
CPC .................................... H04W 72/042
USPC ........................................... 370/280
See application file for complete search history.

(56) References Cited

U.S. PATENT DOCUMENTS

2015/0085782 A1  3/2015  Seo et al.
2016/0330737 A1  11/2016  Takeda et al.
(Continued)

FOREIGN PATENT DOCUMENTS

EP     3096578 A1     11/2016
WO  2013162261 A1    10/2013

OTHER PUBLICATIONS

Extended European Search Report issued in counterpart European Patent Application No. 18208535.7, dated Mar. 14, 2019 (10 pages).
(Continued)

*Primary Examiner* — Peter G Solinsky
(74) *Attorney, Agent, or Firm* — Osha Liang LLP

(57) ABSTRACT

A user terminal carries out radio communication with a plurality of cells by employing carrier aggregation, and has a receiver that, when a connection is established with a TDD cell, receives information about a given DL/UL configuration that is selected from a plurality of DL/UL configurations, and a processor that controls transmission and reception to and from the TDD cell, and a DL/UL configuration to carry out DL communication in all subframes is included as one in the plurality of DL/UL configurations, and the processor uses the DL/UL configuration to carry out DL communication in all subframes as one of the DL/UL configurations only when the connecting TDD cell is a secondary cell. If so, the processor feeds back an A/N in response to each DL subframe of the secondary cell by using a given UL subframe of a primary cell.

1 Claim, 13 Drawing Sheets

A/N FEEDBACK MECHANISM IN TDD (PCell)-FDD (SCell) CA

(56) References Cited

U.S. PATENT DOCUMENTS

2017/0149537 A1* 5/2017 Seo .................. H04L 1/1861
2017/0164361 A1   6/2017 Park
2017/0201969 A1   7/2017 Park

OTHER PUBLICATIONS

International Search Report issued in PCT/JP2014/080071 dated Feb. 10, 2015 (1 page).
Written Opinion of the International Searching Authority issued in PCT/JP2014/080071 dated Feb. 10, 2015 (3 pages).
3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).
Extended European Search Report issued in corresponding European Application No. 14866610.0, dated Jun. 22, 2017 (11 pages).
NTT Docomo, Inc; "Introduction of additional TDD UL/DL configuration in Rel-12"; 3GPP TSG-RAN #62, RP-131781; Busan, Korea; Dec. 3-6, 2013 (11 pages).
Office Action issued in the counterpart European Patent Application No. 14866610.0, dated May 24, 2018 (6 pages).
Office Action issued in the counterpart Japanese Patent Application No. 2014033562, dated Apr. 10, 2018 (8 pages).
CMCC; "Consideration on general FDD/TDD joint operation for LTE"; 3GPP TSG-RAN #60 RP-130696; Oranjestad, Aruba, Jun. 11-14, 2013 (4 pages).
Texas Instruments; "HARQ considerations for TDD-FDD CA"; 3GPP TSG RAN WG1 #75 R1-135615; San Francisco, USA, Nov. 11-15, 2013 (4 pages).
Office Action issued in the counterpart Japanese Patent Application No. 2014-033562, dated Aug. 28, 2018 (10 pages).

* cited by examiner

| SUBFRAME | NUMBER OF OFDM SYMBOLS FOR PDCCH WHEN $N_{RB}^{DL} > 10$ | NUMBER OF OFDM SYMBOLS FOR PDCCH WHEN $N_{RB}^{DL} \leq 10$ |
|---|---|---|
| SUBFRAME 1 AND 6 FOR FRAME STRUCTURE TYPE 2 OTHER THAN UPLINK-DOWNLINK CONFIGURATION 7 | 1,2 | 2 |
| MBSFN SUBFRAMES ON A CARRIER SUPPORTING PDSCH, CONFIGURED WITH 1 OR 2 CELL-SPECIFIC ANTENNA PORTS | 1,2 | 2 |
| MBSFN SUBFRAMES ON A CARRIER SUPPORTING PDSCH, CONFIGURED WITH 4 CELL-SPECIFIC ANTENNA PORTS | 2 | 2 |
| SUBFRAMES ON A CARRIER NOT SUPPORTING PDSCH | 0 | 0 |
| NON-MBSFN SUBFRAMES (EXCEPT SUBFRAME 6 FOR FRAME STRUCTURE TYPE 2 EXCLUDING UPLINK-DOWNLINK CONFIGURATION 7) CONFIGURED WITH POSITIONING REFERENCE SIGNALS | 1,2,3 | 2,3 |
| ALL OTHER CASES | 1,2,3 | 2,3,4 |

FIG.13

USER TERMINAL, RADIO BASE STATION AND RADIO COMMUNICATION METHOD

CROSS REFERENCE TO RELATED APPLICATIONS

The present application is a continuation application of and, thereby, claims benefit under 35 U.S.C. § 120 to U.S. patent application Ser. No. 15/039,235 filed on May 25, 2016, titled, "USER TERMINAL, RADIO BASE STATION, AND RADIO COMMUNICATION METHOD," which is a national stage application of PCT Application No. PCT/JP2014/080071, filed on Nov. 13, 2014, which claims priority to Japanese Patent Application Nos. 2014-033562, 2014-21429, and 2013-244047 filed on Feb. 25, 2014, Feb. 6, 2014, and Nov. 26, 2013, respectively. The contents of the priority applications are incorporated by reference in their entirety.

TECHNICAL FIELD

The present invention relates to a user terminal, a radio base station and a radio communication method that are applicable to a next-generation communication system.

BACKGROUND

In the UMTS (Universal Mobile Telecommunications System) network, the specifications of long term evolution (LTE) have been drafted for the purpose of further increasing high speed data rates, providing lower delay and so on (see non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) have been developed for the purpose of achieving further broadbandization and increased speed beyond LTE, and the specifications thereof have been drafted (Rel. 10/11).

As duplex modes for radio communication in the LTE and LTE-A systems, there are frequency division duplex (FDD) to divide between the uplink (UL) and the downlink (DL) based on frequency, and time division duplex (TDD) to divide between the uplink and the downlink based on time (see FIG. 1A). In TDD, the same frequency region is applied to uplink and downlink communication, and signals are transmitted and received to and from one transmitting/receiving point by dividing between the uplink and the downlink based on time.

In TDD in the LTE system, a plurality of frame configurations (DL/UL configurations) with different transmission ratios of uplink subframes (UL subframes) and downlink subframes (DL subframes) are stipulated. To be more specific, as shown in FIG. 2, seven frame configurations, namely DL/UL configurations 0 to 6, are stipulated, where subframes #0 and #5 are allocated to the downlink and subframe #2 is allocated to the uplink.

Also, the system band of the LTE-A system (Rel. 10/11) includes at least one component carrier (CC), where the system band of the LTE system constitutes one unit. Gathering a plurality of component carriers (cells) to achieve a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY

Generally speaking, DL traffic and UL traffic are asymmetrical. Also, the ratio between UL traffic and DL traffic is not constant, and varies over time or between locations. When carrier aggregation (CA), which was introduced in Rel. 10, is employed, in TDD, geographically-neighboring transmission points are confined to the use of the same DL/UL configuration in a given frequency carrier in order to prevent interference between a plurality of CCs (also referred to as "cells," "transmitting/receiving points," etc.). In Rel. 11, CA (TDD inter-band CA) to employ different DL/UL configurations between different cells is supported, in order to enable flexible switching of DL/UL configurations in accordance with traffic.

Also, in carrier aggregation (CA) in Rel. 10/11, the duplex modes to apply between a plurality of CCs need to be the same duplex mode (see FIG. 1 B). On the other hand, future radio communication systems (for example, Rel. 12 and later versions) may anticipate CA to employ different duplex modes (TDD+FDD) between multiple CCs (see FIG. 1C).

In this way, provided that the forms of the use of radio communication systems have been growing in variety, there is an even stronger demand for flexible control of UL communication and DL communication taking into account traffic and so on. However, when existing mechanisms (for example, the existing DL/UL configurations in TDD) are used, there is a threat that the throughput cannot be improved sufficiently.

The present invention has been made in view of the above, and it is therefore an object of the present invention to provide a user terminal, a radio base station and a radio communication method which can improve throughput when CA is executed between multiple cells including at least a TDD cell.

The user terminal of the present invention provides a user terminal that carries out radio communication with a plurality of cells by employing carrier aggregation, and this user terminal has a receiving section that, when a connection is established with a TDD cell, receives information about a predetermined DL/UL configuration that is selected from a plurality of DL/UL configurations, and a control section that controls transmission and reception to and from the TDD cell based on the predetermined DL/UL configuration received, and a DL/UL configuration to carry out DL communication in all subframes is included as one in the plurality of DL/UL configurations, and the control section uses the DL/UL configuration to carry out DL communication in all subframes as one of the DL/UL configurations only when the connecting TDD cell is a secondary cell.

According to the present invention, it is possible to improve throughput when CA is executed between multiple cells including a TDD cell.

BRIEF DESCRIPTION OF DRAWINGS

FIG. 13 is a diagram to show examples of the number of OFDM symbols to use for the PDCCH when DL/UL configuration 7 is employed, according to one or more embodiments.

DETAILED DESCRIPTION

Figure 1A:
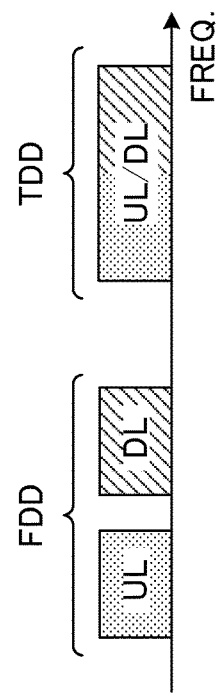
FIGS. 1A, 1B, and 1C provide diagrams to explain an overview of duplex modes in LTE and LTE-A, and intra-base station CA (intra-eNB CA)
Figure 1B:
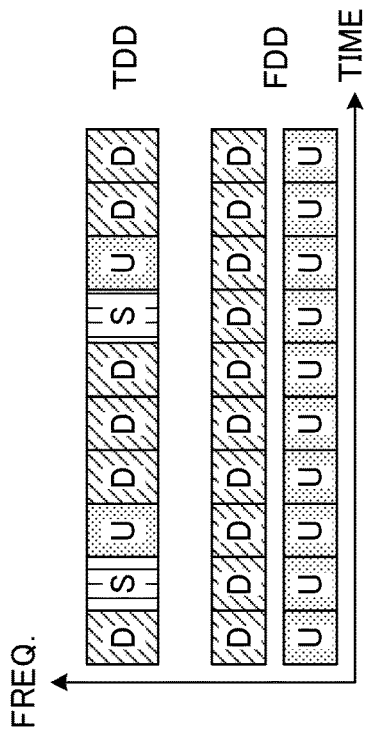
Figure 2:
FIG. 2 is a diagram to explain DL/UL configurations for use in TDD cells of existing systems.

As noted earlier, two duplex modes—namely, FDD and TDD—are stipulated in the LTE and LTE-A systems (see above FIG. 1A), and, in TDD, communication is carried out between a radio base station and a user terminal by using a predetermined DL/UL configuration that is selected from DL/UL configurations 0 to 6 shown in above FIG. 2. In this way, in TDD, the transmission ratio of DL subframes and UL subframes varies per DL/UL configuration, and, the delivery acknowledgement signal (A/N: Acknowledgement/Negative Acknowledgement) feedback mechanism (HARQ mechanism) and so on are stipulated for each configuration.

Figure 1C:
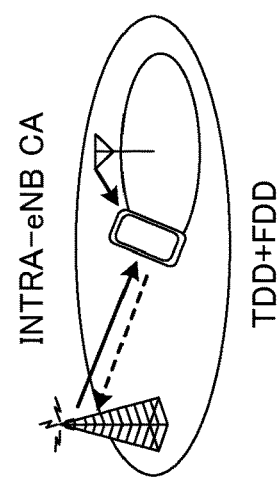

Also, the Rel. 12 and later systems anticipate CA that employs different duplex modes (TDD+FDD) between multiple CCs (see above FIG. 1C). In relationship to this, a study is in progress to employ DL/UL configurations 0 to 6 in TDD in the same manner as in LTE 10. However, when CA is employed between a plurality of cells including a cell that employs TDD (hereinafter also referred to as a "TDD cell"), there is a threat that existing DL/UL configurations may have difficulty improving throughput.

For example, assume a case where DL traffic is heavier than UL traffic. In this case, it may be possible to select a predetermined cell from a plurality of cells where CA is employed, and use this for DL communication. For example, in the event of two-CC CA, it may be possible to use one CC exclusively for DL communication.

In this case, if the selected cell is a cell to employ FDD (hereinafter also referred to as an "FDD cell"), DL communication is possible in every subframe. On the other hand, when the selected cell is a TDD cell, it may be possible to employ the DL/UL configuration in which the configuration ratio of DL subframes is the highest (in FIG. 2, DL/UL configuration 5).

However, even when DL/UL configuration 5 with the highest DL subframe configuration ratio is employed, a UL subframe and a special subframe are included (SF #1 and SF #2). Consequently, when a TDD cell is used exclusively for DL communication, subframes that cannot be used in DL data communication are produced. As a result of this, sufficient improvement of throughput cannot be achieved.

In this way, the present inventors have focused on the fact that it is not possible to optimize throughput with existing DL/UL configurations when CA is executed by using a plurality of cells including a TDD cell, and come up with the idea of using a new DL/UL configuration. To be more specific, the present inventors have come up with the idea of defining a new, additional DL/UL configuration (for example, DL/UL configuration 7) for DL communication in a TDD cell, and using this DL/UL configuration 7 only when the TDD cell serves as a secondary cell (SCell) (not the primary cell (PCell)).

Furthermore, the present inventors have focused on the fact that a new A/N feedback mechanism (HARQ mechanism) is required when a DL/UL configuration for DL communication (for example, DL/UL configuration 7) is use in a TDD cell. To be more specific, the present inventors have come up with the idea of controlling A/N feedback by seeing a TDD cell that uses DL/UL configuration 7 as an FDD cell.

Now, a specific radio communication method according to the present embodiment will be described below in detail with reference the accompanying drawings. Note that, although cases will be described in the following description where two cells (two CCs) carry out CA, the number of cells that can employ CA according to the present embodiment is by no means limited to this. Also, the present embodiment can be applied to intra-base station CA (intra-eNB CA), in which a scheduler is provided to be shared by multiple cells, and inter-base station CA (inter-eNB CA), in which schedulers are provided separately for each of multiple cells, as long as at least one TDD cell is included in the cells that employ CA.

First Example

A case will be described with a first example where, in CA to involve a TDD cell (TDD CC), communication is carried out by adding a new DL/UL configuration for DL communication.

With the present embodiment, a DL/UL configuration for DL communication to enable DL communication in all subframes is newly introduced, in addition to existing DL/UL configurations 0 to 6 for use in TDD. For example, DL/UL configuration 7 is added as the DL/UL configuration for DL communication (see FIG. 3). Consequently, the newly added DL/UL configuration for DL communication (hereinafter also referred to as "DL/UL configuration 7") is configured in the TDD band, as DL/UL configurations 0 to 6 are.

Figure 3:
FIG. 3 is a diagram to show an example of DL/UL configurations for use in TDD cells according to one or more embodiments.

For the DL/UL configuration for DL communication to enable DL communication in all subframes, a structure to make all subframes DL subframes, as shown in FIG. 3, can be employed. When all subframes are made DL subframes, it is possible to improve the spectral efficiency of DL communication even more. Furthermore, by stipulating DL/UL configuration 7 for DL communication as being one the DL/UL configurations that can be configured in TDD cells, this has little impact on the implementation of terminals and frequency allocation, and therefore DL/UL configuration 7 can be introduced easily. Meanwhile, when DL/UL configuration 7 is applied to a TDD band, UL-DL interference, which is characteristic of TDD, is not produced, so that network (NW) synchronization, inter-device coordination (for example, between user terminals and base stations) and so on can be made unnecessary.

Also, DL/UL configuration 7, which is added anew, can be used only when the TDD cell is configured as a secondary cell (SCell), not the primary cell (PCell). This is because a TDD cell to serve as the primary cell needs to receive UL communication (A/Ns, CQIs, etc.) from user terminals.

Here, the primary cell (PCell) refers to the cell that manages RRC connection, handover and so on when CA is executed, and is also a cell that requires UL communication in order to receive data and feedback signals from terminals. The primary cell is always configured whenever CA is executed in the uplink and the downlink. A secondary cell (SCell) refers to another cell that is configured apart from the primary cell when CA is employed. A secondary cell may be configured only in the downlink, or may be configured in the uplink and the downlink simultaneously.

Also, application of DL/UL configuration 7 in a TDD cell that serves as a secondary cell may be configured as appropriate by a radio base station (or a higher station and/or the like) depending on traffic and so on. For example, when a TDD cell is configured as a secondary cell and there is a large amount of DL data for user terminals, the radio base station selects DL/UL configuration 7 from a plurality of DL/UL configurations 0 to 7, and reports information about the DL/UL configuration to use to each user terminal. The information about the DL/UL configuration can be reported through higher layer signaling (broadcast signal, RRC signaling and so on). For the higher layer signaling, for example, system information block 1, radio resource configuration common information elements (RRC common information elements) and so on may be possible. Alternatively, terminal-specific radio resource configuration signaling may be used.

Meanwhile, it is also possible to operate a TDD cell based on DL/UL configuration 7 semi-statically, and allow the radio base station (or a higher station and/or the like) to configure CA in user terminals as appropriate. For example, it may be possible to build a cellular network with an FDD cell or a TDD cell of DL/UL configurations 0 to 6 and provide a TDD cell of DL/UL configuration 7 in a place where the traffic is heavy, so that the radio base station may configure the TDD cell of DL/UL configuration 7 as a secondary cell in user terminals that are capable of CA. Note that the FDD cell or the TDD cell of DL/UL configurations 0 to 6 is configured as the primary cell in the user terminals to execute CA then. By this means, it is possible to off-load the DL data for the user terminals where CA is configured, in the secondary cell. The configuration of CA, the configuration of the primary cell and the secondary cell may be reported through higher layer signaling (broadcast signal, RRC signaling and so on). For the higher layer signaling, for example, system information block 1, radio resource configuration common information elements (RRC common information elements) and so on may be possible. Alternatively, terminal-specific radio resource configuration signaling may be used.

Note that, with the present embodiment, the primary cell may be either a TDD cell or an FDD cell, and, when the secondary cell is a TDD cell, DL/UL configuration 7 can be configured in this TDD cell. Also, the present embodiment is applicable when a TDD cell or an FDD cell of the same or a different DL/UL configuration is additionally configured as an SCell and CA is executed in three or more CCs.

Figures 4A, 4B:
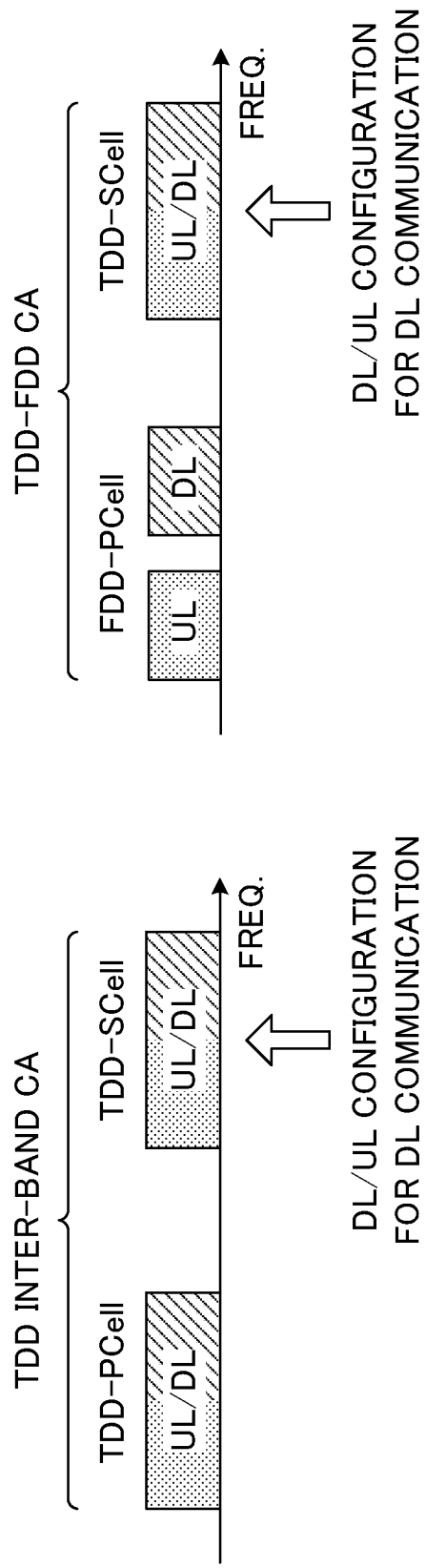
FIGS. 4A and 4B provide diagrams to show examples of system structures where a TDD cell (SCell) uses DL/UL configuration 7, according to one or more embodiments.

FIG. 4 show examples of CA, in which a TDD cell of DL/UL configuration 7 is included as a secondary cell. FIG. 4A shows a case where CA is executed by employing a duplex mode between multiple CCs (cells) (TDD inter-band CA). The primary cell is a TDD cell of DL/UL configurations 0 to 6, and a TDD cell of DL/UL configuration 7 is a secondary cell. FIG. 4B shows a case where CA is executed by employing different duplex modes between different multiple CCs (cells) (TDD-FDD CA). The primary cell is an FDD cell, and a TDD cell of DL/UL configuration 7 is a secondary cell.

In FIG. 4A, in the first TDD cell that serves as the primary cell, a predetermined DL/UL configuration is selected from existing DL/UL configurations 0 to 6 and employed. Meanwhile, in the second TDD cell to serve as a secondary cell, a predetermined DL/UL configuration is selected from existing DL/UL configurations 0 to 6, with an addition of DL/UL configuration 7, and employed. For example, when the second TDD cell is used exclusively for DL communication, DL/UL configuration 7 is configured in the second TDD cell.

In FIG. 4B, in the FDD cell that serves as the primary cell, UL communication and DL communication are carried out in every subframe. On the other hand, in the TDD cell to serve as a secondary cell, a predetermined DL/UL configuration is selected from existing DL/UL configurations 0 to 6 (+DL/UL configuration 7), and employed. For example, when the TDD cell is used exclusively for DL communication, DL/UL configuration 7 is configured in the TDD cell.

In this way, by newly defining and using DL/UL configuration 7 for DL communication in a TDD cell to serve as a secondary cell, it becomes possible to improve the throughput of DL communication regardless of the duplex mode configured in the primary cell.

Figure 5:
FIG. 5 is a diagram to show another example of DL/UL configurations for use in TDD cells according to one or more embodiments.

Note that, although a case is illustrated in above FIG. 3 where all subframes (SFs #0 to #9) are made DL subframes, the present embodiment is by no means limited to this. A structure to employ DL/UL configuration 7 and provide a special subframe in one of the subframes may be used. For example, as shown in FIG. 5, a predetermined subframe (here, one SF #1) is configured as a special subframe. In this case, by using this one special subframe in a TDD cell that serves as a secondary cell, it is possible to transmit the SRS (sounding reference signal) and the PRACH signal (random access signal), in addition to carrying out DL communication.

By enabling transmission of the SRS and the PRACH in this special subframe, DL adaptive transmission, including precoding, adaptive modulation and so on, becomes possible, by using the symmetry of channels. In a TDD cell, communication is carried out by using the same frequency resources and by switching between the uplink and the downlink over time. Consequently, when terminals/base stations and their surrounding environment move only moderately, the channels also vary moderately, so that transmission to utilize the symmetry of channels becomes possible. For example, a radio base station may estimate channel states based on SRSs transmitted from user terminals, and carry out transmission precoding that is suitable for the estimated channel states.

Also, in special subframes, not only the SRS, the PRACH and so on, but also feedback information for a TDD cell where DL/UL configuration 7 is configured may be transmitted. For the feedback information, CSI (Channel State Information), which represents the quality of reception in user terminals, delivery acknowledgement signals in response to DL signals from the TDD cell and so on may be used. By this means, it becomes possible to transmit only minimal UL signals, so that it becomes possible to acquire information that is required in HARQ, adaptive modulation and so on on the radio base station side, without using the primary cell's UL resources in the TDD cell alone. As a result of this, it is possible to improve the situation where the primary cell's UL resources become short, by configuring the TDD cell of DL/UL configuration 7 as a secondary cell.

The feedback information may be linked with the sequences or the resources of the SRS, the PRACH and so on that are transmitted in UL resources (UpPTS) of special subframes, or it is equally possible to define a new special subframe format, and transmit the feedback information in the PUSCH (Physical Uplink Shared Channel) or the PUCCH (Physical Uplink Control Channel) by means of UpPTS. Also, feedback by means of special subframes may be always applied whenever DL/UL configuration 7 is configured, or may be configured apart from DL/UL configuration 7 by means of broadcast information, RRC signaling and so on (that is, feedback by means of special subframes can be configured per user terminal that communicates in DL/UL configuration 7). If separate configuration is possible, the radio base station or the network can have control as to which of the primary cell and a secondary cell of DL/UL configuration 7 sends feedback, on a per terminal basis, so that it is possible to change the feedback format flexibly depending on the conditions and the number of terminals, traffic, the deployment of cells and so on.

Note that, when there is no need to transmit the SRS and the PRACH signal in a TDD cell that serves as a secondary cell, it is preferable to use the configurations shown in above FIG. 3 from the perspective of improving the spectral efficiency of DL communication and making network (NW) synchronization and inter-device coordination unnecessary.

In this way, when CA is executed using a plurality of cells including a TDD cell, it is possible to effectively improve the spectral efficiency of DL communication by using DL/UL configuration 7 for DL communication in the TDD cell that serves as a secondary cell. Also, by defining DL/UL configuration 7 for DL communication anew, communication that is suitable for DL traffic and UL traffic become possible in TDD cells. Furthermore, when DL/UL configuration 7 is used in a TDD cell, UL-DL interference, which is characteristic of TDD, is not produced, so that network (NW) synchronization, inter-device coordination (coordination between user terminals and base stations) and so on can be made unnecessary.

<Variation>

Note that, with the above first example, the radio communication method (for example, the DL/UL configuration which each user terminal employs) may be controlled taking into account the legacy terminals that cannot support (identify) DL/UL configuration 7 (for example, user terminals of Rel. 11 or earlier versions).

For example, assume a case where a TDD cell to serve as a secondary cell is operated based on DL/UL configuration 7 semi-statically, and a radio base station (or a higher station and/or the like) configures CA in user terminals as appropriate depending on traffic and so on. In this case, a structure may be used in which the TDD cell is operated based on DL/UL configuration 7, and arbitrary DL/UL configurations, including DL/UL configuration 7, are reported to user terminals by means of terminal-specific radio resource configuration signaling.

For example, there is a possibility that a terminal that cannot identify DL/UL configuration 7 (for example, a Rel. 11 terminal) is present among a plurality of user terminals. Even in this case, as described above, it is possible to configure a secondary cell with a different DL/UL configuration from DL/UL configuration 7 (for example, DL/UL configuration 2 or DL/UL configuration 5), for the terminal that is unable to identify DL/UL configuration 7, by using terminal-specific radio resource configuration signaling. Meanwhile, for terminals that support DL/UL configuration 7 (that is, terminals that can identify DL/UL configuration 7 (for example, terminals of Rel. 12 and later versions), DL/UL configuration 7 may be configured.

In this way, by configuring DL/UL configurations depending on the capabilities of user terminals, it is not only possible to configure a TDD cell as a secondary cell of DL/UL configuration 7 in which the DL ratio is high for terminals that support DL/UL configuration 7, but also to allow terminals that do no support DL/UL configuration 7 to connect with the TDD cell as a secondary cell.

Furthermore, cases might occur where a user terminal that is unable to support DL/UL configuration 7 identifies a TDD cell that operates based on DL/UL configuration 7 as the primary cell or as a cell that operates on a stand-alone basis (non-CA cell). In this case, there is a threat that the user terminal tries to transmit uplink signals in DL/UL configuration 7, in which no UL subframe is configured (for example, uplink random access and so on). So, the present embodiment may be structured so that a user terminal that is unable to support DL/UL configuration 7 cannot identify a TDD cell that uses DL/UL configuration 7 as the primary cell or a non-CA cell. Note that a cell that operates on a stand-alone basis refers to a cell that can establish an initial connection with a user terminal independently (that is, without being a secondary cell (SCell) in CA).

For example, a TDD cell that operates based on DL/UL configuration 7 may be structured not to transmit system information blocks. This TDD cell is configured only as a secondary cell, and never used as the primary cell or as a non-CA cell. System information of a cell that is configured as a secondary cell can be signaled on a per user terminal basis, by using radio resource configuration signaling by the primary cell.

Consequently, when a secondary cell is configured, a user terminal does not have to receive the system information in that secondary cell. On the other hand, when a user terminal connects with a TDD cell as the primary cell or as a non-CA cell, the user terminal must receive the system information in this cell. Consequently, by not transmitting the system information, it is possible to remove the possibility that a terminal that is unable to identify DL/UL configuration 7 (for example, a Rel. 11 terminal) tries to connect with the TDD cell as the primary cell or as a non-CA cell. By this means, it is possible to prevent a terminal that is unable to identify DL/UL configuration 7 from transmitting uplink signals in the TDD cell.

Alternatively, in a TDD cell that operates based on DL/UL configuration 7, identification information of an existing DL/UL configuration (for example, DL/UL configuration 5) may be transmitted in the system information block. By this means, the TDD cell can operate as the primary cell or as a non-CA cell where an existing DL/UL configuration is configured when there are only user terminals (for example, Rel. 11 terminals) that cannot identify DL/UL configuration 7 in the cell, and actually operate as a secondary cell of DL/UL configuration 7 only when there is a user terminal that can identify DL/UL configuration 7.

Also, it is possible to configure information to report an existing DL/UL configuration (for example, DL/UL configuration 5) in this TDD cell's system information block, and command dynamic switching of the DL/UL configuration, depending on traffic, the distribution of user terminals and so on, by using an L1/L2 physical downlink control channel (PDCCH (Physical Downlink Control Channel) or EPDCCH (Enhanced PDCCH)), a MAC (Medium Access Control) control element, and so on. Whether or not to switch the DL/UL configuration dynamically can be reported to user terminals in advance by using user-specific radio resource configuration signaling. Then, when triggered by the L1/L2 PDCCH (Physical Downlink Control Channel or the MAC control element, the DL/UL configuration is changed on a temporary basis based on the DL/UL configuration that is configured in the system information. Upon detecting the above trigger, a user terminal changes the DL/UL configuration and communicates until a predetermined period of time is over or until a new command is detected. By this means, it becomes possible to change the DL/UL configuration dynamically, depending on the distribution of user terminals, traffic, and so on in TDD cells.

Second Example

A/N feedback mechanism (HARQ mechanism) for when DL/UL configuration 7 for DL communication is employed will be described with a second example.

As described above, it is possible to improve throughput by defining and using DL/UL configuration 7 for DL communication anew in a TDD cell that serves as a secondary cell. On the other hand, when DL/UL configuration 7 for DL communication is employed, there are subframes to carry out UL communication (A/N feedback and so on), and how A/Ns should be fed back in response to each DL subframe is the problem.

For example, when inter-band CA is carried out in a first TDD cell and a second TDD cell, with existing mechanisms, feedback in response to DL subframes of each TDD cell can be sent by using each cell's UL subframes. However, in TDD-TDD CA shown in above FIG. 4A, when DL/UL configuration 7 is used in the second TDD cell, how to feed back A/Ns, CQIs and so on is the problem because no UL subframe is available for the DL subframes of the second TDD cell.

Consequently, with the present embodiment, when A/Ns and/or the like are fed back, a TDD cell to use DL/UL configuration 7 is seen as an FDD cell, and the feedback of A/Ns and/or the like is controlled (the HARQ mechanism is employed). That is, when a TDD cell to serve as a secondary cell employs DL/UL configuration 7, this TDD cell is seen as an FDD cell, and A/Ns, CQIs and/or the like in response to this TDD cell's DL subframes are multiplexed on predetermined UL subframes of the primary cell.

For example, assume a case where, as shown in above FIG. 4B, an FDD cell is configured as the primary cell, a TDD cell is configured as a secondary cell and DL/UL configuration 7 is used in the TDD cell. In this case, the TDD cell is seen as an FDD cell, and a DL HARQ mechanism for FDD-FDD CA (for example, the HARQ mechanism of Rel. 10) is employed (see FIG. 6).

Figure 6:
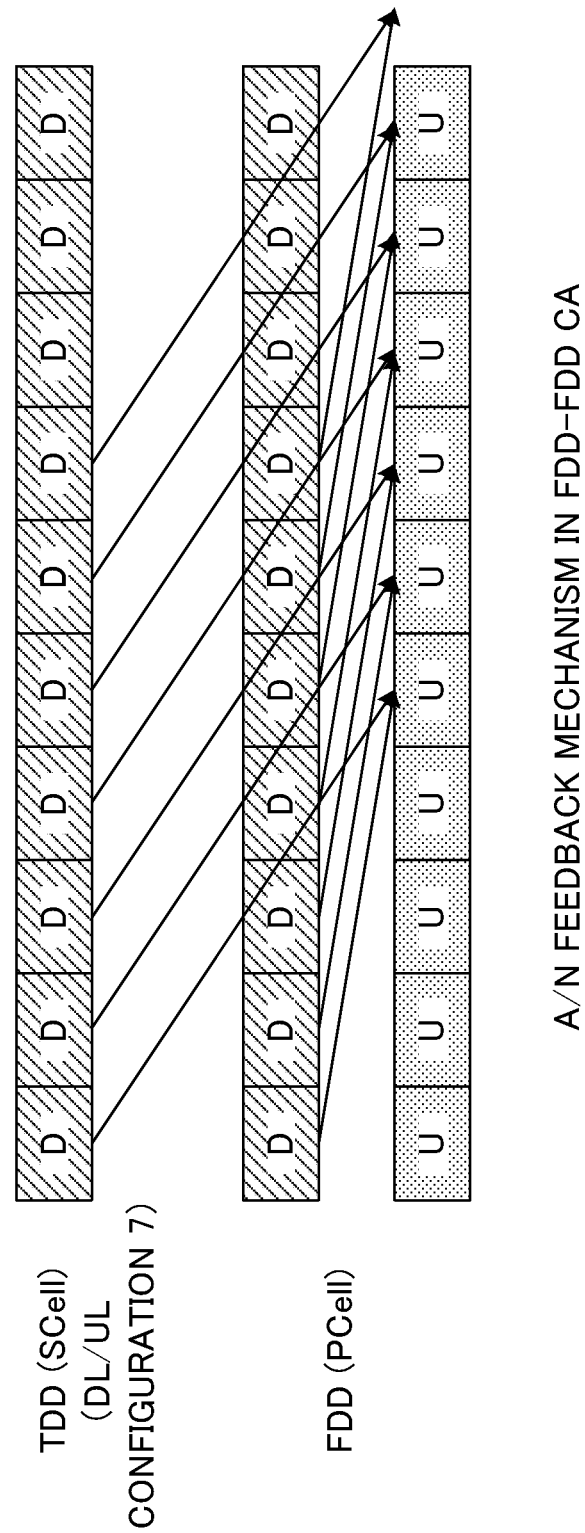
FIG. 6 is a diagram to show an example of A/N feedback when a TDD cell (SCell) uses DL/UL configuration 7, according to one or more embodiments.

For example, when the number of CCs (cells) that employ CA is two, it is possible to multiplex the A/Ns for each DL subframe of the TDD cell on predetermined UL subframes of the FDD cell, by using PUCCH format 1b with channel selection (see FIG. 6). Also, when the number of CCs (cells) to employ CA is three or less, it is possible to multiplex the A/Ns for each DL subframe of the TDD cell on predetermined UL subframes of the FDD cell by using PUCCH format 3.

In this way, when the primary cell is an FDD cell, by seeing a TDD cell where DL/UL configuration 7 is configured as an FDD cell, it is possible to see this case as being the same as 2-DL/1-UL CA by an FDD cell to serve as the primary cell and an FDD cell to serve as a secondary cell. In this case, it is possible to send A/N feedback by using the mechanism of FDD-FDD CA that is already stipulated in Rel. 10. As a result of this, it is possible to make it unnecessary to introduce a new DL HARQ mechanism for DL/UL configuration 7. Consequently, it becomes possible to implement CA with existing device structures of terminals and radio base stations, reduce the increase of cost and enable practical use in the shortest period of time.

Also, assume a case where, as shown in above FIG. 4A, the first TDD cell is configured as the primary cell, the second TDD cell is configured as a secondary cell and DL/UL configuration 7 is used in the second TDD cell. In this case, the second TDD cell is seen as an FDD cell, and the DL HARQ mechanism of 2-DL/1-UL TDD-FDD CA (for example, the HARQ mechanism stipulated in Rel. 12) is employed (see FIG. 7).

Figure 7:
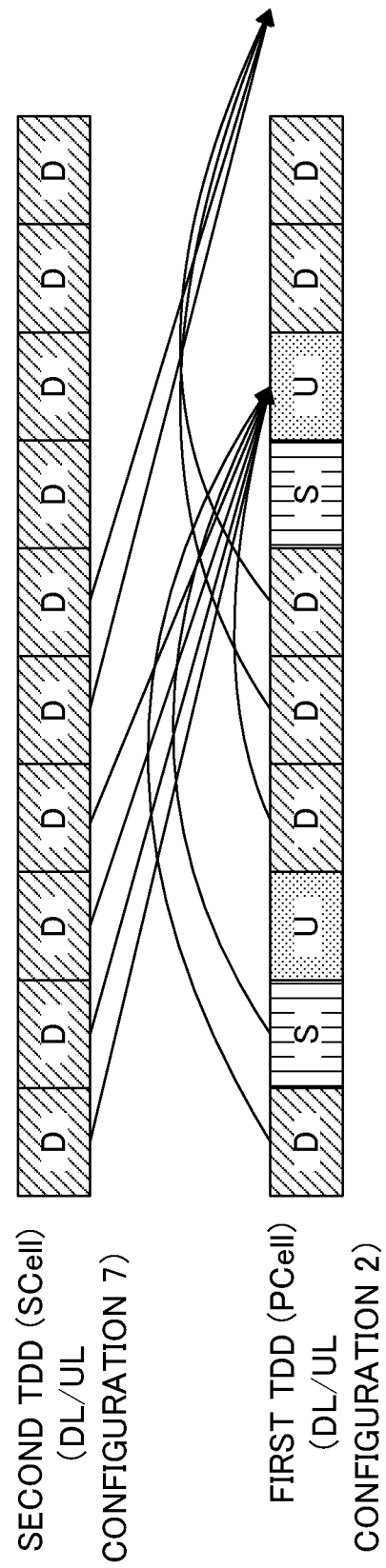
FIG. 7 is a diagram to show another example of A/N feedback when a TDD cell (SCell) uses DL/UL configuration 7, according to one or more embodiments.

FIG. 7 shows a feedback mechanism, whereby, in TDD-FDD CA (the PCell is a TDD cell), the A/Ns in response to all DL subframes of an FDD cell (a second TDD cell) can be allocated to UL subframes of a TDD cell (a first TDD cell). To be more specific, in FIG. 7, the first TDD cell (PCell) to serve as the PCell employs the A/N feedback timing of DL/UL configuration 2. Also, using DL/UL configuration 2 as a basis (reference), the second TDD cell that serves as an SCell allocates the A/Ns in all DL subframes of the second TDD cell to UL subframes of the first TDD cell (DL/UL configuration 2+α).

That is, it is possible to send A/N feedback even in response to subframes (SFs #2 and #7 of the second TDD cell) where normally UL is configured in DL/UL configuration 2. Note that the feedback destination of the A/Ns of these subframes (SFs #2 and #7) may be, for example, the same feedback destination as that of neighboring subframes. Note that, although FIG. 7 illustrates a case where DL/UL configuration 2 is used as a basis for the A/N feedback timings of the second TDD cell that is seen as an FDD cell, the present embodiment is by no means limited to this. Any feedback mechanism may be applicable as long as the A/Ns in all DL subframes of the second TDD cell can be allocated.

Note that the HARQ mechanism that is applicable to the present embodiment is by no means limited to that in FIG. 7, and any HARQ mechanism that is employed in TDD-FDD CA can be used.

Furthermore, depending on the number of CCs, the DL/UL configuration in the PCell and so on, cases might occur where the number of A/N bits to feed back in one UL subframe of the PCell becomes greater than the value that can be multiplexed in existing PUCCH formats (PUCCH format 1b with channel selection and PUCCH format 3). Such cases can be handled by limiting the A/N feedback in response to predetermined DL subframes of the SCell. Alternatively, such cases can also be handled by applying A/N bundling to the A/Ns in response to predetermined DL subframes of the SCell.

In this way, when the primary cell is a TDD cell, seeing a TDD cell, which serves as a secondary cell and in which DL/UL configuration 7 is configured, as an FDD cell makes it possible to see this case as being the same as 2-DL/1-UL CA by a TDD cell to serve as the primary cell and an FDD cell to serve as a secondary cell. In this case, it is possible to send A/N feedback by using the TDD-FDD CA mechanism studied in Rel. 12. As a result of this, it is not necessary to introduce a new DL HARQ mechanism for DL/UL configuration 7.

<UL HARQ>

Furthermore, when DL/UL configuration 7 is used in a TDD cell that serves as a secondary cell, how to execute UL retransmission control (UL HARQ) in carrier aggregation is the problem. For example, assume a case where, as shown in above FIG. 4B, an FDD cell is configured as the primary cell, a TDD cell is configured as a secondary cell and DL/UL configuration 7 is used in the TDD cell. In this case, how to execute PUSCH retransmission control in response to the PHICH (Physical Hybrid-ARQ Indicator Channel) reported from the radio base stations is the problem.

According to the present embodiment, the TDD cell (DL/UL configuration 7) that serves as a secondary cell is seen as an FDD cell, and UL retransmission control in carrier aggregation is executed. For example, assume a case where a user terminal carries out retransmission in response to the PHICH (for example, a NACK) that is reported in the n-th subframe. Note that an A/N that is reported in the PHICH is equivalent to an A/N in response to the uplink signal (PUSCH signal) in an earlier subframe than the n-th subframe (for example, the (n−4)-th subframe). Based on the PHICH that is reported, the user terminal carries out retransmission in response to the PHICH reported in the n-th subframe, in a predetermined subframe (for example, the (n+4)-th subframe), by using an UL subframe of an FDD cell that serves as the primary cell. Note that the PHICH can be reported from the primary cell to the user terminal.

In this way, when the primary cell is an FDD cell in TDD-FDD CA, by seeing a TDD cell where DL/UL configuration 7 is configured as an FDD cell, it is possible to see this case as being the same as 2-DL/1-UL CA by an FDD cell to serve as the primary cell and an FDD cell to serve as a secondary cell. In this case, it is possible to send A/N feedback by using the mechanism of FDD-FDD CA that is already stipulated in Rel. 10. As a result of this, it is possible to make it unnecessary to introduce a new DL HARQ mechanism for DL/UL configuration 7. Consequently, it becomes possible to implement CA with existing device structures of terminals and radio base stations, reduce the increase of cost and enable practical use in the shortest period of time.

Also, with the present embodiment, it is possible to see a TDD cell (DL/UL configuration 7) that serves as a secondary cell as an existing TDD cell (for example, DL/UL configuration 5), and execute UL retransmission control in carrier aggregation. For example, assume a case where a user terminal carries out retransmission in response to the PHICH (for example, a NACK) that is reported in the n-th subframe. Note that an A/N that is reported in the PHICH is equivalent to an A/N in response to the uplink signal (PUSCH signal) in an earlier subframe than the n-th subframe (for example, the (n−6)-th subframe). Based on the PHICH that is reported, the user terminal carries out retransmission in response to the PHICH reported in the n-th subframe, in a predetermined subframe (for example, the (n+4)-th subframe), by using an UL subframe of an FDD cell that serves as the primary cell. Note that, since there is only one subframe in which uplink signals can be transmitted in the above-described example, it then follows that there is only one downlink subframe of the secondary cell in which the PHICH can be transmitted. Consequently, when uplink signals (for example, the primary cell's uplink signals) to correspond to downlink subframes apart from this are retransmitted, it may be possible to use the PDCCH or the EPDCCH, not the PHICH. Note that the PHICH can be reported from the primary cell to the user terminal.

In this way, when the primary cell in TDD-FDD CA is an FDD cell, by applying the same UL retransmission control as in DL/UL configuration 5 to a TDD cell in which DL/UL configuration 7 is configured, the PHICH is transmitted in the same downlink subframes as in DL/UL configuration 5. By this means, it is possible to provide adequate support for user terminals which do not support DL/UL configuration 7 (for example, UEs of Rel. 11 or earlier versions) and in which DL/UL configuration 5 is configured. This is because the PDCCH mapping method varies depending on whether or not the PHICH is present in downlink subframes.

Third Example

As noted earlier, in the DL/UL configuration for DL communication that enables DL communication in all subframes (DL/UL configuration 7), there are no UL subframes. Consequently, when DL/UL configuration 7 is used, it is possible to stipulate different operations from those of existing DL/UL configurations 0 to 6. Now, an example of the operation in the to event DL/UL configuration 7 is employed will be described.

<Control Channel Format Indicator>

The control channel format indicator (PCFICH: Physical Control Format Indicator Channel) reports information about the number of symbols used for a downlink control channel (PDCCH) in subframes. For example, when existing DL/UL configurations 0 to 6 are used in TDD, the number of OFDM symbols for the PDCCH is limited to two or less in subframes 1 and 6 depending on the number of resource blocks (RBs) to use in the downlink ($N^{DL}_{RB}$) (see FIG. 13).

For example, the number of OFDM symbols for the PDCCH is configured to one or two in the event of $N^{DL}_{RB}>10$, and the number of OFDM symbols for the PDCCH is configured to two in the event of $N^{DL}_{RB} \leq 10$. This is because, since, in existing DL/UL configurations for TDD, special subframe are configured in subframes 1 and 6 (in subframe 6, special subframes are configured only in part of the DL/UL configurations), the number of symbols that can be used for DL communication (DwPTS) is smaller than with regular DL subframes.

On the other hand, as shown in above FIG. 3, when DL/UL configuration 7, in which no UL subframe or special subframe is configured, is used, the number of symbols for DL communication is not limited in subframes 1 and 6. Consequently, when DL/UL configuration 7 is used, unlike DL/UL configurations 0 to 6, it is possible to stipulate the number of OFDM symbols for the PDCCH in subframes 1 and 6, without limiting this to two or less (see FIG. 13). For example, when DL/UL configuration 7 is used, it is possible to make the number of OFDM symbols for the PDCCH one, two or three in the event of the number of RBs>10, and make the number of OFDM symbols for the PDCCH two, three or four in the event of the number of RBs≤10.

In this way, when DL/UL configuration 7 is employed, a structure may be employed in which the number of OFDM symbols to use for the PDCCH in subframes 1 and 6 can be configured differently from when DL/UL configurations 0 to 6 are employed. By this means, when DL/UL configuration 7 is employed in TDD, it is possible to control the PCFICH (the number of OFDM symbols to use for the PDCCH) flexibly depending on DL/UL configurations.

<CSI-RS Mapping>

The CSI-RS (Channel State Information-Reference Signal) is a reference signal for estimating downlink channel states. When existing DL/UL configurations 0 to 6 are used in TDD, a user terminal operates on the assumption that the CSI-RS is not transmitted in special subframes. This is because, in special subframes, the number of symbols that can be used for DL communication (DwPTS) is small compared to that in regular DL subframes.

On the other hand, when DL/UL configuration 7 shown in above FIG. 3 is used, special subframes are not configured. So, with the present embodiment, when DL/UL configurations 0 to 6 for TDD, which do not include DL/UL configuration 7, are used, a user terminal performs receiving operations on the assumption that the CSI-RS is not transmitted in special subframes. That is, a user terminal to employ TDD assumes that the CSI-RS is not configured in special subframes in DL/UL configurations 0 to 6, and, in DL/UL configuration 7, can perform receiving operations without assuming that the transmission of the CSI-RS is limited.

<Aperiodic CSI Feedback>

When a CSI request field for triggering an aperiodic CSI report is included in a downlink control channel (PDCCH/EPDCCH), a user terminal that employs FDD sends a report using the PUSCH a predetermined number of subframes later. For example, when aperiodic CSI report-triggering information is included in a downlink control channel that is received in the n-th subframe, aperiodic CSI is fed back using the PUSCH in the (n+4)-th subframe.

As noted earlier, since there are no UL subframes in DL/UL configuration 7, how a user terminal using this DL/UL configuration 7 should send an aperiodic CSI report is the problem. Consequently, the present embodiment may be structured so that aperiodic CSI feedback is controlled in the same manner in user terminals that employ DL/UL configuration 7 and user terminals that employ FDD.

For example, assume a case where, as shown in above FIG. 4B, an FDD cell is configured as the primary cell, a TDD cell is configured as a secondary cell and DL/UL configuration 7 is configured in the TDD cell. In this case, if aperiodic CSI report-triggering information is included in a downlink control channel that is received in the n-th subframe, a user terminal feeds back aperiodic CSI in the PUSCH in the (n+4)-th subframe of the primary cell (FDD cell).

<HARQ-ACK Repetition Operation>

A radio base station can configure the HARQ-ACK repetition operation in user terminals by using higher layer signaling. A user terminal in which the HARQ-ACK repetition operation repeats transmitting A/Ns with predetermined parameters. In existing systems, HARQ-ACK repetition is allowed only for user terminals where only one serving cell (FDD cell or TDD cell) is configured. Furthermore, HARQ-ACK repetition is allowed only when A/N bundling is used. This is to secure coverage by improving the quality of reception of A/Ns that is deteriorated due to bundling.

Meanwhile, when DL/UL configuration 7 is used, a similar structure to that of FDD DL is assumed because there are no UL subframes. Consequently, even in TDD, when DL/UL configuration 7 is used, a structure to support HARQ-ACK repetition can be used and is not limited to the case of executing A/N bundling. By this means, it is possible to improve the quality of reception of A/Ns.

(Structure of Radio Communication System)

Now, an example of a radio communication system according to the present embodiment will be described in detail below.

Figure 8:
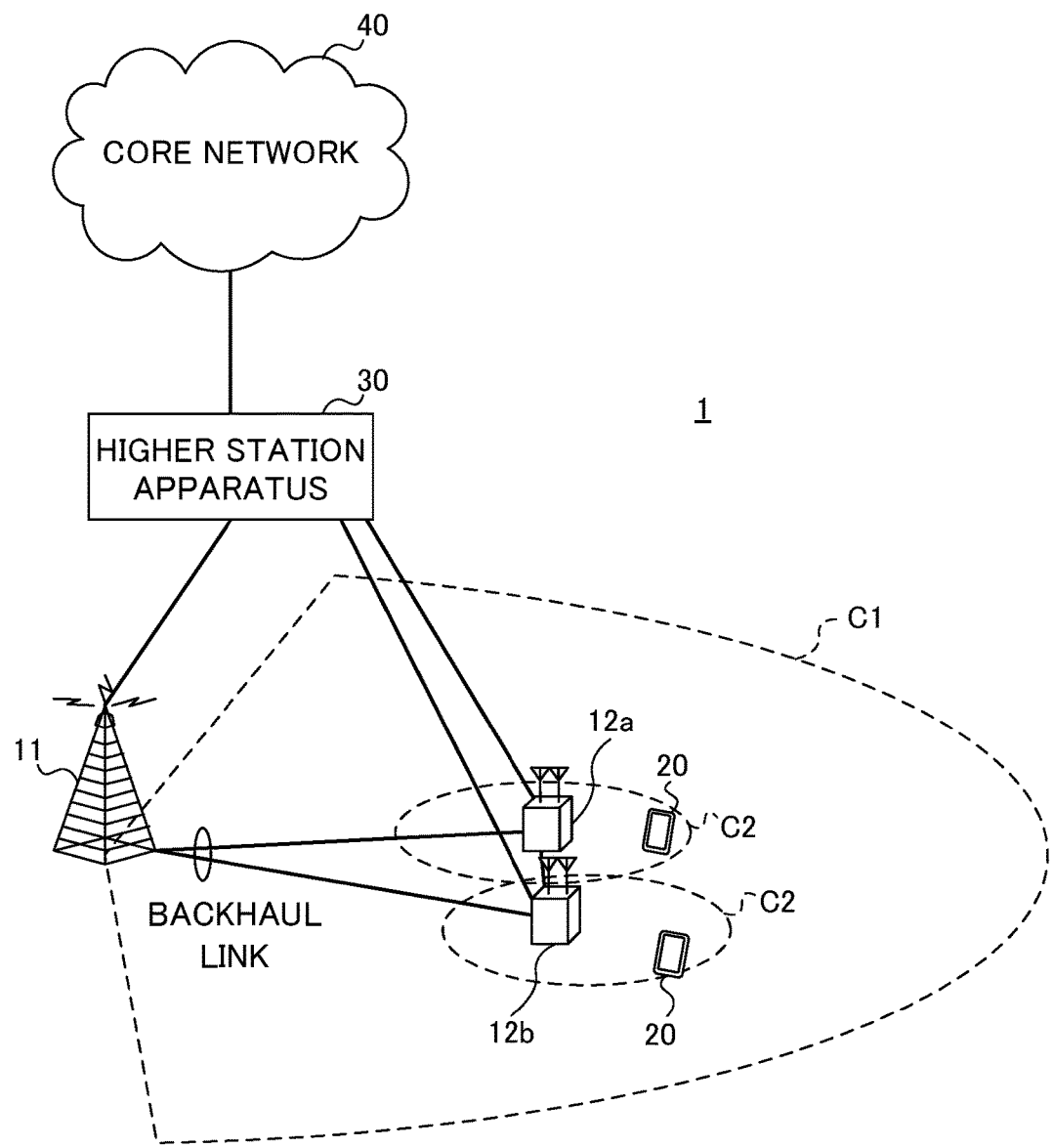
FIG. 8 is a schematic diagram to show an example of a radio communication system according to one or more embodiments.

FIG. 8 is a schematic structure diagram of the radio communication system according to the present embodiment. Note that the radio communication system shown in FIG. 8 is a system to incorporate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G" or "FRA (Future Radio Access)."

The radio communication system 1 shown in FIG. 8 includes a radio base station 11 that forms a macro cell C1, and radio base stations 12a and 12b that are placed inside the macro cell C1 and form small cells C2, which are narrower than the macro cell C1. Also, user terminals 20 are placed in the macro cell C1 and in each small cell C2. The user terminals 20 can connect with both the radio base station 11 and the radio base stations 12 (dual connectivity). Also, intra-base station CA (intra-eNB CA) or inter-base station CA (inter-eNB CA) is applied between the radio base station 11 and the radio base stations 12. Also, for CA between the radio base station 11 and the radio base stations 12, TDD-TDD CA, TDD-FDD CA and/or the like can be applied.

Communication between the user terminals 20 and the radio base station 11 can be carried out by using a carrier of a relatively low frequency band (for example, 2 GHz) and a narrow bandwidth (referred to as "existing carrier," "legacy carrier," etc.). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, the X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. The radio base stations 11 and 12 will be hereinafter collectively referred to as "radio base station 10," unless specified otherwise. The user terminals 20 are terminals to support various communication schemes such as LTE, LTE-A and so on, and may be both mobile communication terminals and stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks, per terminal, and allowing a plurality of terminals to use mutually different bands.

Here, communication channels to be used in the radio communication system shown in FIG. 8 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are communicated by the PDSCH. Scheduling information for the PDSCH and the PUSCH and so on are communicated by the PDCCH (Physical Downlink Control CHannel). The number of OFDM symbols to use for the PDCCH is communicated by the PCFICH (Physical Control Format Indicator CHannel). HARQ ACKs and NACKs in response to the PUSCH are communicated by the PHICH (Physical Hybrid-ARQ Indicator CHannel). Also, the scheduling information for the PDSCH and the PUSCH and so on may be communicated by the enhanced PDCCH (EPDCCH) as well. This EPDCCH is frequency-division-multiplexed with the PDSCH (downlink shared data channel).

Uplink control channels include the PUSCH (Physical Uplink Shared CHannel), which is used by each user terminal 20 on a shared basis as an uplink data channel, and the PUCCH (Physical Uplink Control CHannel), which is an uplink control channel. User data and higher control information are communicated by this PUSCH. Also, by means of the PUCCH, downlink radio quality information (CQI: Channel Quality Indicator), ACKs/NACKs and so on are communicated.

Figure 9:
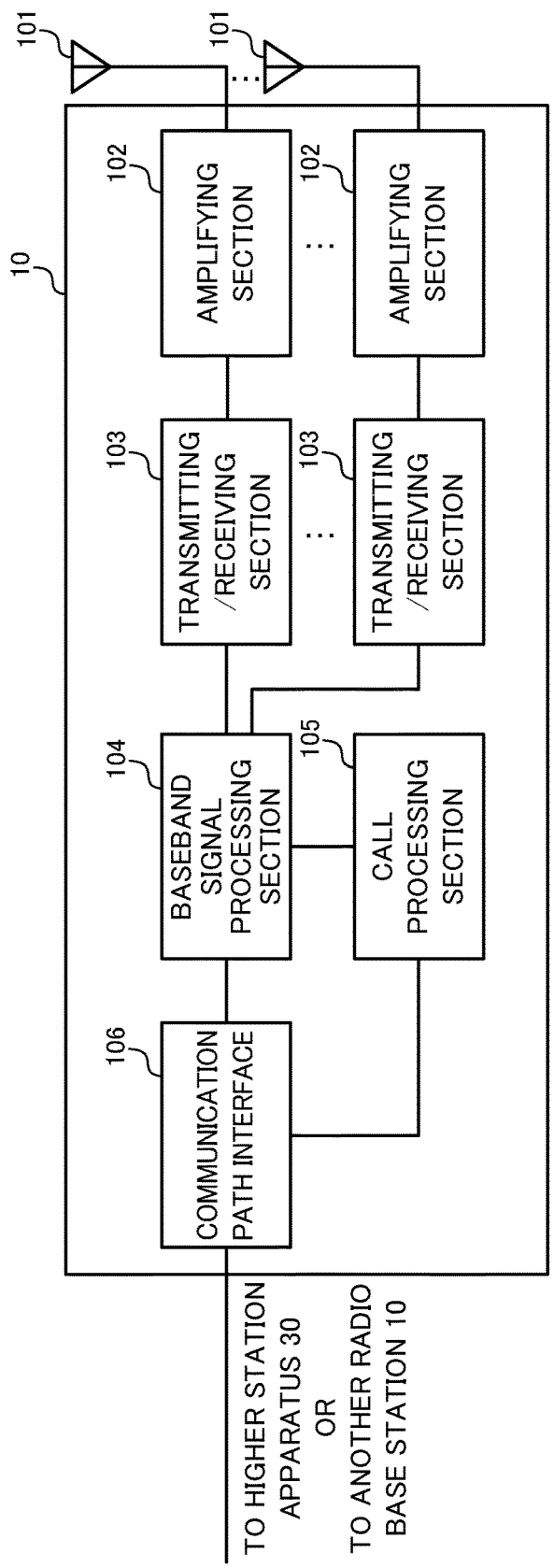
FIG. 9 is a diagram to explain an overall structure of a radio base station according to embodiments.

FIG. 9 is a diagram to show an overall structure of a radio base station 10 (which may be either a radio base station 11 or 12) according to the present embodiment. The radio base station 10 has a plurality of transmitting/receiving antennas 101 for MIMO communication, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30, into the baseband signal processing section 104, via the communication path interface 106.

In the baseband signal processing section 104, a PDCP (Packet Data Convergence Protocol) layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and forwarded to each transmitting/receiving section 103.

Also, the baseband signal processing section 104 reports, to the user terminal 20, control information for allowing communication in the cell, through higher layer signaling (RRC signaling, broadcast signal and so on). The information to allow communication in the cell includes, for example, information about the DL/UL configurations used in TDD cells, the uplink or downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101. The transmitting/receiving sections 103 function as transmission sections to transmit the information about the DL/UL configurations for use in TDD cells, through higher layer signaling (broadcast signal, RRC signaling and so on).

On the other hand, as for data to be transmitted from the user terminal 20 to the radio base station 10 on the uplink, the radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT (Fast Fourier Transform) process, an IDFT process, error correction decoding, a MAC retransmission control receiving process, and RLC layer and PDCP layer receiving processes, and the result is forwarded to the higher station apparatus 30 via the communication path interface 106. The call processing section 105 performs call processing such as setting up and releasing communication channels, manages the state of the radio base stations 10 and manages the radio resources.

Figure 10:
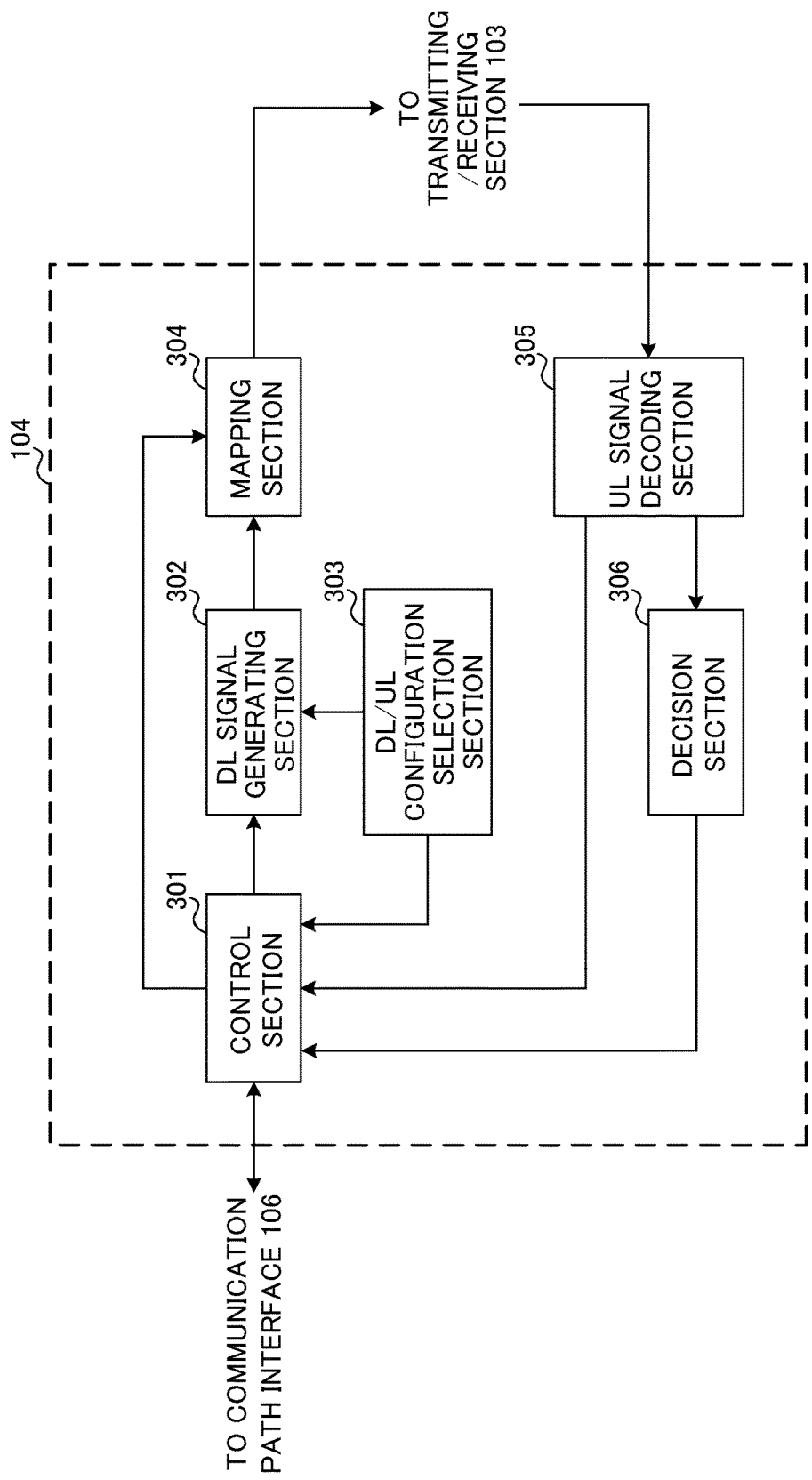
FIG. 10 is a diagram to explain a functional structure of a radio base station according to one or more embodiments.

FIG. 10 is a diagram to show a principle functional structure of the baseband signal processing section 104 provided in the radio base station 10 according to the present embodiment. As shown in FIG. 10, the baseband signal processing section 104 provided in the radio base station 10 is comprised at least of a control section 301, a DL signal generating section 302, a DL/UL configuration selection section 303, a mapping section 304, a UL signal decoding section 305 and a decision section 306.

The control section 301 controls the scheduling of downlink user data that is transmitted in the PDSCH, downlink control information that is communicated in the PDCCH and/or the enhanced PDCCH (EPDCCH), downlink reference signals and so on. Also, the control section 301 controls the scheduling of uplink data that is communicated in the PUSCH, uplink control information that is communicated in the PUCCH or the PUSCH, and uplink reference signals (allocation control). Information regarding the allocation control of uplink signals (uplink control signals and uplink user data) is reported to the user terminal by using a downlink control signal (DCI: Downlink Control Information).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Furthermore, when the radio base station 10 uses TDD, the allocation of downlink signals and uplink signals to each subframe is controlled based on the DL/UL configuration for use in TDD, selected in the DL/UL configuration selection section 303.

For example, when DL/UL configuration 7 is configured in a TDD cell that serves as a secondary cell, the control section 301 carries out DL communication to the user terminal in all subframes. Also, in inter-eNB CA, the control section 301 is provided for each of multiple CCs separately, and, in intra-eNB CA, the control section 301 is provided to be shared by multiple CCs.

The DL signal generating section 302 generates the downlink control signals (PDCCH signal and/or EPDCCH signal), downlink data signals (PDSCH signal) and so on that are determined to be allocated by the control section 301. To be more specific, based on commands from the control section 301, the DL signal generating section 302 generates DL assignments, which report downlink signal allocation information, and UL grants, which report uplink signal allocation information. Also, the DL signal generating section 302 generates information about the DL/UL configuration selected in the DL/UL configuration selection section 303.

The DL/UL configuration selection section 303 selects the DL/UL configuration to use in TDD by taking into account traffic and so on. With the present embodiment, a DL/UL configuration for DL communication (for example, DL/UL configuration 7) is defined anew in a TDD cell (see above FIG. 3, FIG. 5, etc.). The DL/UL configuration selection section 303 can select DL/UL configuration 7 only when this TDD cell is a secondary cell (SCell). For example, the DL/UL configuration selection section 303 selects DL/UL configuration 7 from among a plurality of DL/UL configurations 0 to 7 when a TDD cell is configured as a secondary cell and there is a large amount of data for user terminals. Note that the DL/UL configuration selection section 303 can select a DL/UL configurations based on information from the higher station apparatus 30 and so on.

The mapping section 304 controls the allocation of the downlink control signals and downlink data signals generated in the DL signal generating section 302 to radio resources based on commands from the control section 301.

The UL signal decoding section 305 decodes the feedback signals (delivery acknowledgement signals, etc.) transmitted from the user terminal through an uplink control channel (PUCCH), and outputs the results to the control section 301. Also, the UL signal decoding section 305 decodes the uplink data signals transmitted from the user terminal in the uplink shared channel (PUSCH) and outputs the results to the decision section 306. The decision section 306 makes retransmission control decisions (ACKs/NACKs) based on the decoding results in the UL signal decoding section 308, and outputs the results to the control section 301.

Figure 11:
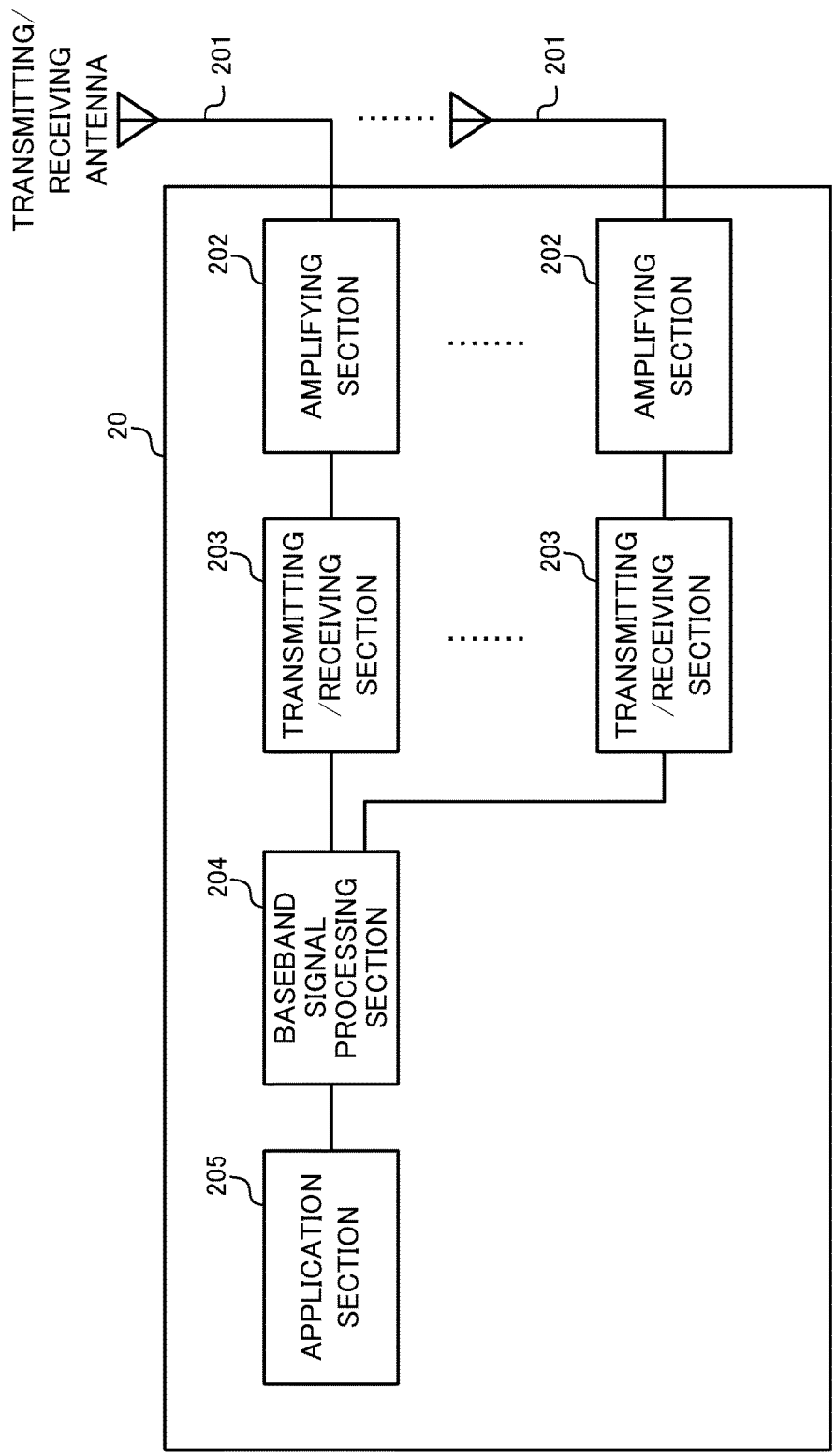
FIG. 11 is a diagram to explain an overall structure of a user terminal according to one or more embodiments.

FIG. 11 is a diagram to show an overall structure of the user terminal 20 according to the present embodiment. The user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into baseband signals in the transmitting/receiving sections 203. The baseband signals are subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205. When the user terminal 20 connects with a TDD cell, the transmitting/receiving sections 203 function as receiving sections that receive information about a predetermined DL/UL configuration that is selected from a plurality of DL/UL configurations.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is forwarded to each transmitting/receiving section 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 12:
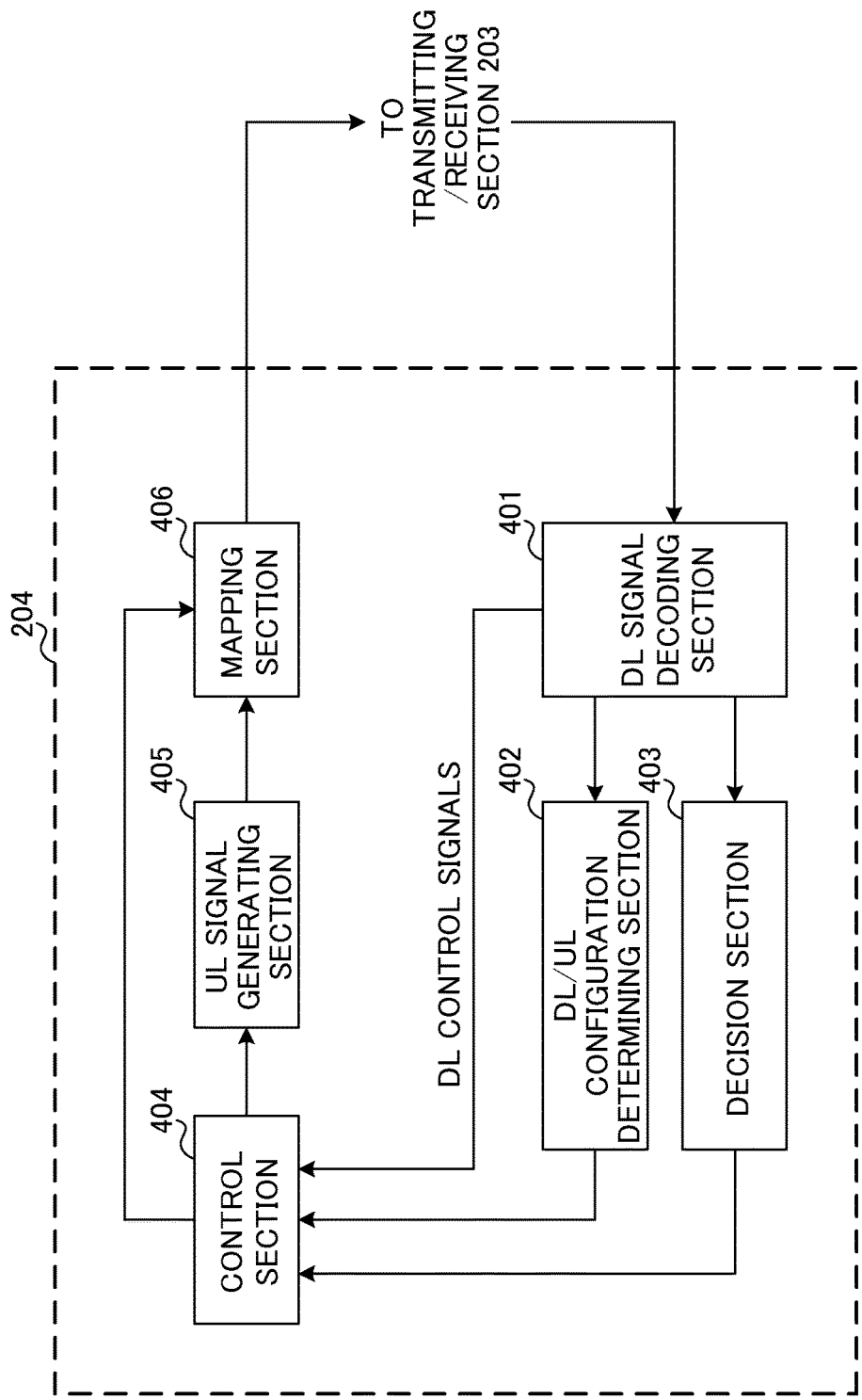
FIG. 12 is a diagram to explain a functional structure of a user terminal according to one or more embodiments.

FIG. 12 is a diagram to show a principle functional structure of the baseband signal processing section 204 provided in the user terminal 20. As shown in FIG. 12, the baseband signal processing section 204 provided in the user terminal 20 is comprised at least of a DL signal decoding section 401, a DL/UL configuration determining section 402, a decision section 403, a control section 404, a UL signal generating section 405 and a mapping section 406.

The DL signal decoding section 401 decodes the downlink control signals (PDCCH signal) transmitted in a downlink control channel (PDCCH), and outputs the scheduling information (information regarding the allocation to uplink resources) to the control section 404. Furthermore, the DL signal decoding section 401 decodes the downlink data signals transmitted in a downlink shared channel (PDSCH) and outputs the results to the decision section 403. The decision section 403 makes retransmission control decisions (ACKs/NACKs) based on the decoding results in the DL signal decoding section 401, and also outputs the results to the control section 404.

The DL/UL configuration determining section 402 identifies the DL/UL configuration-related information that is reported from the radio base station. The DL/UL configuration determining section 402 outputs the DL/UL configuration-related information that is detected, to the control section 404 and so on. Note that, with the present embodiment, the DL/UL configuration determining section 402 detects above DL/UL configuration 7 only when the user terminal connects with a TDD cell that serves as a secondary cell.

The control section 404 controls the generation of uplink control signals (A/N signals and so on) and uplink data signals based on the downlink control signals (PDCCH signals) transmitted from the radio base stations, retransmission control decisions with respect to the PDSCH signals received, and so on. The downlink control signals are output from the DL signal decoding section 401, and the retransmission control decisions are output from the decision section 403.

Also, the control section 404 controls the transmission of uplink control signals and uplink data signals based on the DL/UL configuration-related information that is output from the DL/UL configuration determining section 402. For the DL/UL configurations, one of the DL/UL configurations 0 to 7 shown in above FIG. 3 and FIG. 5 is used. Note that DL/UL configuration 7 is used only when the connecting TDD cell is a secondary cell.

Also, the control section 404 also functions as a feedback control section that controls the feedback of delivery acknowledgement signals (A/Ns) in response to the PDSCH signal. To be more specific, in a communication system in which CA is employed, the control section 401 controls the selection of the cells (or the CCs) where delivery acknowledgement signals are fed back, the PUCCH resources to allocate the delivery acknowledgement signals to, and so on.

For example, when the primary cell is an FDD cell, a secondary cell is a TDD cell and DL/UL configuration 7 is configured in the TDD cell, the control section 404 can see the TDD cell as an FDD cell, and employ the A/N feedback mechanism in FDD cell-FDD cell CA (see above FIG. 6). In this case, the control section 404 feeds back the A/Ns in response to each DL subframe of the TDD cell by using predetermined UL subframes of the FDD cell.

Also, when the primary cell and a secondary cell are TDD cells and DL/UL configuration 7 is configured in the TDD cell serving as a secondary cell, the control section 404 can see the TDD cell being a secondary cell as an FDD cell, and employ the A/N feedback mechanism in TDD cell-FDD cell CA (see above FIG. 7). In this case, the control section 404 controls A/N feedback so that the A/Ns in response to all DL subframes of the TDD cell that serves as a secondary cell can be allocated to UL subframes of the primary cell.

The UL signal generating section 405 generates uplink control signals (feedback signals such as delivery acknowledgement signals, channel state information (CSI) and so on) based on commands from the control section 404. Also, the UL signal generating section 405 generates uplink data signals based on commands from the control section 404. Note that, when DL/UL configuration 7 is configured, the UL signal generating section 405 generates uplink control signals in response to DL signals, without generating uplink data signals.

The mapping section 406 (allocation section) controls the allocation of uplink control signals (delivery acknowledgement signals and so on) and uplink data signals to radio resources (PUCCH and PUSCH) based on commands from the control section 404. For example, the mapping section 406 allocates the uplink control signals based on the number of CCs, by using PUCCH format 1b with channel selection, PUCCH format 3 and so on.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, a plurality of examples described above may be combined and implemented as appropriate. Consequently, the description herein is provided only for the purpose of explaining examples, and should by no means be construed to limit the present invention in any way.

The invention claimed is:

1. A user terminal that carries out radio communication with a primary cell and a secondary cell, the user terminal comprising:
   a receiver that, when a connection is established with a TDD cell, receives configuration information about a given DL/UL configuration that is selected from a plurality of DL/UL configurations; and
   a processor that controls transmission and reception to and from the TDD cell based on the received DL/UL configuration,
   wherein, if the primary cell is an FDD cell and DL communication is applied to the secondary cell throughout a period to which the configuration information about the DL/UL configuration is applied, then the processor feeds back an A/N in response to each DL subframe of the secondary cell by using a given UL subframe of a primary cell.

* * * * *